United States Patent Office 2,967,170
Patented Jan. 3, 1961

2,967,170

REACTION OF SILICOLS WITH SILICON-BONDED HYDROGEN

Robert L. Merker, Pittsburgh, Pa., assignor to Dow Corning Corporation, Midland, Mich., a corporation of Michigan No Drawing. Filed June 14, 1957, Ser. No. 665,644

6 Claims. (Cl. 260—46.5)

The present invention relates to a novel method for bringing about the formation of siloxane bonds by the reaction of a silicon-bonded OH group with a silicon-bonded hydrogen atom.

Organosiloxane resins, rubbers, and fluids are now well known articles of commerce. In the manufacture of some of these "silicone" products, silicon atoms containing silicon-bonded hydrogen atoms are incorporated by way of impurities contained in the intermediates which are used. In some instances this leads to undesirable properties in the final product. One object of the present invention is to provide a practical method for removing such silicon-bonded hydrogen from the product without impairing other desirable properties.

Many silicone products also contain silicon-bonded hydroxy groups. As is well known, this may be either desirable or undesirable, depending upon the nature of the particular product. However in instances where such groups are not desired, it is often found difficult, if not impossible, to remove substantially all of the hydroxy groups without resorting to severe treatments which impair the product. Accordingly, a second object of this invention is to provide a practical method for removing silicon-bonded hydroxy groups from organosiloxanes.

A further object is the provision of an improved method for bringing about faster, lower temperature polymerization and "curing" of organosiloxanes. Other objects and advantages will be apparent from the following description.

I have found that chloroplatinic acid, even in almost negligible amounts, makes possible a reaction which can be illustrated by the following simplified equation:

$$\equiv\text{SiOH} + \text{HSi}\equiv \rightarrow \equiv\text{SiOSi}\equiv + \text{H}_2$$

Thus the present invention is particularly concerned with the method which comprises reacting (1) an organosilicon compound containing at least one silicon-bonded hydroxy group per molecule, with (2) an organosilicon compound containing at least one silicon-bonded hydrogen atom per molecule, the organic groups in each compound being free of aliphatic unsaturation and being attached to the silicon atoms by C—Si linkage, by contacting (1) and (2) in the liquid phase in the presence of chloroplatinic acid.

The organic groups in reactants (1) and (2) above can be any organic groups capable of attachment to silicon by C—Si linkage, so long as they do not contain aliphatic unsaturation. With this one limitation, these groups can be, e.g., monovalent hydrocarbon radicals or halogenated derivatives thereof, or any of the "functional" organic groups attached to silicon as detailed extensively in the literature of the last few years. Examples of such functional groups include ethers, e.g., MeOCH$_2$—, EtO(CH$_2$)$_3$— and MeOC$_6$H$_4$—; amines such as NH$_2$CH$_2$CH$_2$— and PhNHCH$_2$—; aldehydes such as —C$_6$H$_4$CHO and —C$_2$H$_4$CHO; ketones such as MeCOCH$_2$— and PhCOCH$_2$CH$_2$— acids such as HOOCCH$_2$— and HOOC(CH$_2$)$_3$—, carboxylic esters such as EtOOCCH$_2$—, (EtOCO)$_2$CHCH$_2$— and MeCOOC$_2$H$_4$—; amides such as —CH$_2$CH$_2$CONH$_2$, nitriles such as —CH$_2$CN, thiocyanates such as

—CH$_2$SCN and a host of others. The formulas and preparation of hundreds of such "carbon-functional silicones" have been compiled and set forth in the entire December 1956 issue of "Chemical Reviews." The symbols Me, Et and Ph have been used above and throughout this specification to represent methyl, ethyl and phenyl radicals respectively.

The valences of the silicon atoms not satisfied by the aforesaid organic groups, or by the required H atoms and OH groups, can be satisfied by any other substituents capable of attachment to silicon. Thus, for example, the remaining valences can be satisfied by oxygen atoms (e.g., in the form of alkoxy or aryloxy groups, or oxygen attached to another silicon atom as in a siloxane), or by nitrogen (as in amino groups or silazane compound), or by other silicon atoms as in the polysilanes,— or by halogen atoms, or sulfur attached to carbon as in thiol derivatives, or tin or germanium attached to carbon, etc. Of course it is preferable that whatever substitutents are present on the one reactant be unreactive toward the substituents present on the other reactant, to avoid highly complex reaction products. Even if competing reactions are possible, however, they do not prevent the reaction of this invention from taking place to some extent.

A preferred form of the hydroxylated organosilicon reactant (1) is one having the average general formula $$R_x(HO)_y\text{SiO}_{\frac{4-x-y}{2}}$$

where R is a monovalent organic radical free of aliphatic unsaturation and is attached to the silicon by C—Si linkage, $x$ has an average value of from 0.8 to 3 inclusive, $y$ has an average value of from 0.01 to 2 inclusive, and the sum of $x+y$ is not greater than 4. This general formula is inclusive of monomers of the formula $$R_q\text{Si(OH)}_{4-q}$$

where $q$ is 2 or 3, e.g., Ph$_2$Si(OH)$_2$, Ph$_3$SiOH, Me$_3$SiOH, and Ph$_2$MeSiOH; as well as polymers wherein only one or some of the silicon atoms in a given molecule contain the silicon-bonded hydroxy group. The latter polymers preferably consist essentially of units of the formula $$R_z\text{SiO}_{\frac{4-z}{2}}$$

where $z$ is an integer of from 0 to 3 inclusive, and preferably contain an average of from 0.01 to 0.5 silicon-bonded OH groups per silicon atom. Although any individual unit within the polymer can contain from 0 to 3 R groups attached to the Si atom of that particular unit, in the complete polymer there should be an average of from 0.8 to 2.5 R groups per Si atom. In other words, $z$ above should have an average value of from 0.8 to 2.5. As is well known in the art, polymers with a fractional "degree of substitution" of this sort can contain R$_3$SiO$_{.5}$, R$_2$SiO, RSiO$_{1.5}$, or SiO$_2$ units in any combination suitable to give the desired average value.

The term "polymer" herein is used as inclusive of dimers and copolymers. The required OH groups can of course be attached to any of the silicon atoms in the polymer. It is conventional in the art, when setting forth the unit formula of an organosiloxane polymer, to disregard the formula of those units which contain the uncondensed OH groups. Hence it is to be understood that the polymeric definition given above actually includes units not only of the defined

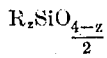

formula, but also units of the formula

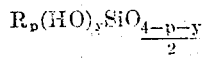

where $p+y$ has a maximum value of 3, $p$ is 0 to 2 inclusive, and $y$ is 1 or 2. There must be sufficient of the latter units present to provide the required average of from 0.01 to 0.5 OH groups per silicon atom in the complete polymer.

Hydroxylated monomers and polymers of the type in question are well known, and many are commercially available. The R groups can be the same or different on any particular silicon atom or on the different silicon atoms within a polymer. Preferably R represents an alkyl radical such as methyl, ethyl, octadecyl, cyclohexyl, or benzyl; an aryl radical such as phenyl, xenyl, naphthyl or tolyl; a haloalkyl radical such as 1,1,1-trifluoropropyl, chloroethyl, or trichloromethyl; or a haloaryl radical such as chlorophenyl, dibromophenyl, or $\alpha,\alpha,\alpha$-trifluorotolyl. Those compounds in which R is methyl and/or phenyl are particularly preferred because of their availability, cost, and superior thermal resistance. Hence the very most preferred of the polymeric hydroxylated reactants can be defined as consisting essentially of units of the formula $$(CH_3)_c(C_6H_5)_d SiO_{\frac{4-c-d}{2}}$$

where $c$ is from 0 to 3 inclusive, $d$ is from 0 to 2 inclusive, and the sum of $c+d$ is from 1 to 3 inclusive with the average value of $c+d$ in the polymer being from 1 to 2.5 inclusive, and said polymer containing an average of from 0.05 to 0.5 silicon-bonded OH groups per silicon atom. As discussed previously, the latter can be attached to any one or more silicon atoms within the polymeric molecule.

The second organosilicon reactant employed in this invention is one which contains at least one silicon-bonded hydrogen atom per molecule. As discussed above, all organic groups in the reactant should be free of aliphatic unsaturation, but except for this limitation the organic groups can be any group capable of being attached to silicon. The preferred organohydrogenosilicon reactants, however, are those falling within the general formula

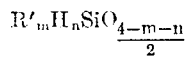

where $R'$ is a monovalent hydrocarbon radical free of aliphatic unsaturation, $m$ has a value of from 0.8 to 3 inclusive, $n$ has a value of from 0.05 to 3 inclusive, and the sum of $m+n$ is not greater than 4.

It can be seen that this formula is inclusive of both monomeric and polymeric compounds. I prefer monomeric compounds having the formula $R'_m SiH_{4-m}$ where $m$ is an integer of from 1 to 3 inclusive, disiloxanes of the formula $R'_2HSiOSiHR'_2$, polymers consisting essentially of units of the formula $R'HSiO$, and copolymers containing from 5 to 99.9 mol percent of units of the formula

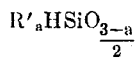

(where $a$ is an integer of from 0 to 2 inclusive) with the remaining units consisting essentially of units of the formula

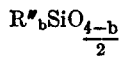

where $b$ is an integer of from 0 to 3 inclusive. In the latter copolymer, $a+b$ should have an average value of at least 0.8, in other words, the ratio of total organic radicals $R'$ and $R''$ per silicon atom should be at least 0.8:1. Fractional average values for $m$, $n$, $a$, or $b$ in the above formulas can of course be obtained by employing a mixture of monomers or polymers as the reactants, or by using a copolymer in which the various units have different values for the subscripts in question. In the above formulas, $R'$ preferably represents alkyl and/or aryl radicals. $R''$ can be, e.g., alkyl, aryl, haloalkyl, or haloaryl radicals. In each case, $R'$ or $R''$ can be the same or different radicals in any particular molecule. The illustrative radicals listed above in regard to the R radicals are also suitable as the $R'$ and $R''$ radicals in question.

The monomers and polymers described above are well known in the art. As with the other reactant used herein, the preferred radicals are methyl and/or phenyl. When a copolymer is employed it is most preferred that from 5 to 99.9 mol percent of the units be of the formula $(CH_3)HSiO$, with the remaining units consisting essentially of units of the formula

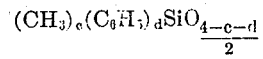

as defined previously. It is well known that a copolymer of the latter type can also contain silicon-bonded hydroxy groups. When such is the case, and the OH groups are present in the required amount of from 0.01 (preferably 0.05) to 0.5 OH per silicon atom, the copolymer can be a source of both the SiH and SiOH substituents. Thus it is possible for a single reactant to contain both types of the necessary reactive groups, and to react with itself in the presence of chloroplatinic acid to provide a higher molecular weight polymer.

The chloroplatinic acid used herein can be used in its usual commercial form, i.e. as the hexahydrate $$H_2PtCl_6 \cdot 6H_2O$$

The dehydrated acid is also effective, but no advantage seems to come from the dehydration and the unnecessary step is preferably avoided. In general the catalyst is used in an amount of from about $1 \times 10^{-7}$ to about $1 \times 10^{-2}$ mole per molar equivalent of silicon-bonded hydrogen. Smaller amounts are effective but often lead to a slower reaction, and usually there is no advantage to be gained from the use of larger amounts. To facilitate handling such small amounts of catalyst, it is preferable to employ a solution of the catalyst. A great number of the organic alcohols are good solvents for the catalyst.

Many of the reactants defined herein will react in the presence of chloroplatinic acid at ordinary room temperature. The slower reactions can be expedited by increasing the temperature up to any point short of the decomposition temperature of the reactants, but temperatures in the region of 25° to 150° C. are generally adequate. The reaction is carried out in the liquid phase, and for volatile reactants or when higher temperatures are desirable, any pressure necessary to maintain a liquid phase can be used.

If desired, inert solvents such as benzene, toluene, xylene, saturated petroleum hydrocarbons and the like can be present during the reaction. Such solvents may in fact be desirable to maintain the required liquid phase where the reactants are high molecular weight or crystalline materials. Any resinous polymers used herein as reactants should of course not be polymerized or "cured" beyond the point at which they lose their solubility in organic solvents such as benzene, for the reaction herein must be at least initiated in the liquid phase. With the proper choice of reactants, the reaction of this invention can then be used to produce such cured, insoluble resins as end products.

The reactants herein can be brought together in any ratio whatsoever, the chosen ratio depending upon the effect or product which is sought. If one desires to eliminate the last trace of hydroxy groups from a compound, a large excess of the silicon-hydrogen compound may be used, and if a volatile compound is chosen for the latter, the excess can be removed from the system by distillation. The opposite approach can be taken when one wishes to remove the last trace of silicon bonded hydrogen from a particular compound. In most instances, however, the molar ratio of "SiH" to "SiOH" will lie in the region of from 1:2 to 2:1, and obviously it will often be desirable to employ substantially molecular equivalents of the two.

The following examples are illustrative only. All parts are parts by weight unless otherwise specified.

*Example 1*

A mixture was prepared consisting of 6 g. of a copolymeric organosiloxane (A) containing equimolar proportions of $PhSiO_{1.5}$, PhMeSiO, and McHSiO units and 10 g. of a toluene solution containing 60% by weight of a copolymer (B) of 35 mol percent PhMeSiO, 10 mol percent $Me_2SiO$, 25 mol percent $MeSiO_{1.5}$, and 30 mol percent $PhSiO_{1.5}$ units. The latter copolymer contained 2.83% by weight of uncondensed silicon-bonded OH groups, thus the mixture contained about 0.01 mole silicon-bonded OH and about 0.018 mole silicon-bonded hydrogen. Sufficient chloroplatinic acid (as a concentrated solution in isopropanol) was added to the mixture to provide 35 parts per million Pt based on the weight of resin solids, representing a ratio of about $1.16 \times 10^{-3}$ mole of the acid per mole of silicon-bonded hydrogen. When this catalyzed mixture was heated at 150° C., hydrogen was evolved and the resin was found to be completely cured to a tack-free, insoluble state in about 2 hours. When no chloroplatinic acid was added, the same resin mixture was tacky and uncured even after 24 hours at 150° C.

*Example 2*

A mixture was prepared consisting of 6 parts of resin A of Example 1 and 10 parts of a 60% by weight solution in toluene of a copolymer containing 53 mol percent PhMeSiO, 28 mol percent $MeSiO_{1.5}$, 14 mol percent $PhSiO_{1.5}$, and 5 mol percent $Ph_2SiO$ units. The latter copolymer contained about 2.8% by weight of silicon-bonded OH groups. Sufficient chloroplatinic acid was mixed into one portion of the resin mixture to provide 30 parts per million of Pt based on the resin solids ($1 \times 10^{-3}$ mole acid per mole silicon-bonded hydrogen). This catalyzed portion was heated at 150° C., and was found to be completely cured in about 2 hours. Another portion, to which the catalyst was added in an amount of 14 p.p.m. Pt, cured in about 8 hours at 150° C., whereas the uncatalyzed resin mixture did not cure in 24 hours at that temperature.

*Example 3*

A mixture was prepared consisting of 37 g. (0.276 mole) of $(Me_2HSi)_2O$ and 237.6 g. of a 50% by weight toluene solution of a copolymer containing 53 mol percent PhMeSiO, 28 mol percent $MeSiO_{1.5}$, 14 mol percent $PhSiO_{1.5}$, and 5 mol percent $Ph_2SiO$ units. The latter copolymer contained 2% by weight silicon-bonded OH groups, thus the mixture contained a ratio of about 4 moles silicon-bonded hydrogen per mole silicon-bonded OH. To the resulting solution there was added $5.5 \times 10^{-6}$ mole chloroplatinic acid, thus providing $1 \times 10^{-5}$ mole acid per mole silicon-bonded hydrogen. The slow evolution of hydrogen which began at room temperature was expedited by heating the mixture at reflux temperature. When the toluene and excess $(Me_2HSi)_2O$ were removed by distillation, the residue was a viscous copolymer in which all of the original hydroxy groups had apparently been replaced by end-blocking units of the formula $-OSi(Me)_2OSiMe_2H$. Such a copolymer is readily reacted with any organic olefin, using e.g. chloroplatinic acid as a catalyst, by the well known silane hydrogen-olefin addition reaction. By such a process, functional organic groups are readily incorporated into an organosiloxane polymer.

*Example 4*

Chloroplatinic acid was added to an equimolar mixture of $Ph_2Si(OH)_2$ and $(Me_2HSi)_2O$ in an amount of about $1 \times 10^{-3}$ mole Pt per mole silicon-bonded hydrogen. The mixture was heated to about 100° C. to dissolve the $Ph_2Si(OH)_2$, and a rapid evolution of hydrogen gas took place. A viscous polymer was formed containing units of the formula:

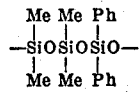

*Example 5*

An equimolar mixture of $MeHSiCl_2$, $PhSiCl_3$, $Si(OEt)_4$, and $PhMeSiCl_2$ was mixed with an equal weight of toluene and cohydrolyzed by adding it to a large excess of water. The hydrolyzate was washed free of acid to provide a toluene solution of a copolymer containing equimolar amounts of MeHSiO, $PhSiO_{1.5}$, $SiO_2$, and PhMeSiO units. This copolymer had a silicon-bonded OH content of about 0.8% by weight. When chloroplatinic acid was added in an amount of $1 \times 10^{-3}$ mole per mole silicon-bonded hydrogen and the mixture heated to 100° C., hydrogen gas was evolved and a resinous copolymer of increased molecular weight was obtained.

*Example 6*

By heating a toluene solution of the cohydrolyzate of the appropriate organochlorosilanes, a copolymer was prepared containing equimolar proportions of MeHSiO, $Cl_2C_6H_3SiO_{1.5}$, and $F_3CCH_2CH_2(Me)SiO$ units. Six parts of this copolymer was added to 6 parts of resin B from Example 1 in 4 parts toluene. When chloroplatinic acid was added to provide 30 p.p.m. Pt based on resin solids, and a thin layer of the mixture heated to 100° C., hydrogen gas was evolved and a solid resinous film was produced.

*Example 7*

By cohydrolysis of the appropriate organochlorosilanes under mild conditions, a copolymer was prepared containing equimolar proportions of PhMeSiO, $MeSiO_{1.5}$, $BrC_6H_4(Me)SiO$, and $F_3CCH_2CH_2SiO_{1.5}$ units and having a silicon-bonded OH content of about 1.3% by weight. A toluene solution of this copolymer was mixed with $(MeHSiO)_4$ in a proportion providing molar equivalents of SiOH and SiH. When chloroplatinic acid was added to provide 30 p.p.m. Pt and the mixture heated at 100° C., hydrogen gas was evolved and a copolymer of increased molecular weight was obtained.

*Example 8*

When 1 mole of an hydroxylated dimethylsiloxane having the average formula $HOSi(Me)_2O(Me_2SiO)_3Si(Me)_2OH$ is mixed with 2 moles $Ph_2MeSiH$ and heated to 100° C. in the presence of $2 \times 10^{-3}$ mole chloroplatinic acid, hydrogen is evolved and the $-SiPhMe_2$ end-blocked polymer is obtained.

*Example 9*

When the toluene solution of resin B from Example 1 is mixed with sufficient $PhSiH_3$ to provide one silicon-bonded H per silanol group, and chloroplatinic acid is added in an amount of 30 p.p.m. Pt based on the resin weight, the mixture evolves hydrogen and produces a cross-linked, cured resin when heated at 150° C.

That which is claimed is:

1. The method which comprises reacting (1) an hydroxylated organosilicon compound having the average general formula $$R_x(HO)_ySiO_{\frac{4-x-y}{2}}$$

where R is a monovalent organic radical free of aliphatic unsaturation and free of alcoholic hydroxy groups, and is attached to the silicon by C—Si linkage, $x$ has an average value of from 0.8 to 3 inclusive, $y$ has an average value of from 0.01 to 2 inclusive, and the sum of $x+y$ is not greater than 4, with (2) an organohydrogenosilicon compound having the average general formula $$R'_mH_nSiO_{\frac{4-m-n}{2}}$$

where R' is a monovalent hydrocarbon radical free of aliphatic unsaturation, $m$ has a value of from 0.8 to 3 inclusive, $n$ has a value of from 0.05 to 3 inclusive, the sum of $m+n$ being not greater than 4, by contacting (1) and (2) as the sole reactants in the liquid phase in the presence of chloroplatinic acid.

2. The method which comprises reacting (1) an hydroxylated organosilicon compound selected from the group consisting of (A) a compound of the formula $R_qSi(OH)_{4-q}$ where R is selected from the group consisting of alkyl, aryl, haloalkyl, and haloaryl radicals and $q$ is an integer of from 2 to 3 inclusive, and (B) an organosiloxane polymer consisting essentially of units of the formula $$R_zSiO_{\frac{4-z}{2}}$$

where R is as above defined and $z$ is an integer of from 0 to 3 inclusive and has an average value in the complete polymer of from 0.8 to 2.5, said polymer containing an average of from 0.01 to 0.5 silicon-bonded OH groups per silicon atom, with (2) an organohydrogenosilicon compound selected from the group consisting of (C) a compound of the formula $R'_mSiH_{4-m}$ where $m$ is an integer of from 1 to 3 inclusive, (D) an organosiloxane consisting essentially of units of the formula R'HSiO, (E) an organodisiloxane of the formula $$R'_2HSiOSiHR'_2$$

and (F) an organosiloxane copolymer containing from 5 to 99.9 mol percent of units of the formula $$R'_aHSiO_{\frac{3-a}{2}}$$

where $a$ is an integer of from 0 to 2 inclusive, the remaining units consisting essentially of units of the formula $$R''_bSiO_{\frac{4-b}{2}}$$

where $b$ is an integer of from 0 to 3 inclusive, $a+b$ having an average value in the complete copolymer of at least 0.8, the radicals R' in (C), (D), (E), and (F) each being selected from the group consisting of alkyl and aryl radicals and R'' being selected from the group consisting of alkyl, aryl, haloalkyl, and haloaryl radicals, by contacting (1) and (2) as the sole reactants in the liquid phase in the presence of chloroplatinic acid.

3. The method which comprises reacting (1) an organosiloxane polymer consisting essentially of polymeric units of the formula $$(CH_3)_c(C_6H_5)_dSiO_{\frac{4-c-d}{2}}$$

where $c$ is from 0 to 3 inclusive, $d$ is from 0 to 2 inclusive, and the sum of $c+d$ is from 1 to 3 inclusive, the average value of $c+d$ in said polymer being from 1 to 2.5 inclusive and said polymer containing an average of from 0.05 to 0.5 silicon-bonded OH groups per silicon atom, with (2) an organosiloxane copolymer containing from 5 to 99.9 mol percent of units of the formula $(CH_3)HSiO$, the remaining units consisting essentially of units of the formula $$(CH_3)_c(C_6H_5)_dSiO_{\frac{4-c-d}{2}}$$

as defined above, by contacting (1) and (2) as the sole reactants in the liquid phase in the presence of chloroplatinic acid.

4. The method which comprises reacting a compound of the formula $(C_6H_5)_2Si(OH)_2$ with a compound of the formula $(CH_3)_2HSiOSiH(CH_3)_2$, by contacting the two compounds as the sole reactants in the liquid phase in the presence of chloroplatinic acid.

5. The method which comprises contacting an organosiloxane copolymer containing from 5 to 99.9 mol percent of units of the formula $(CH_3)HSiO$, the remaining units consisting essentially of units of the formula $$(CH_3)_c(C_6H_5)_dSiO_{\frac{4-c-d}{2}}$$

where $c$ is from 0 to 3 inclusive, $d$ is from 0 to 2 inclusive, and the sum of $c+d$ is from 1 to 3 inclusive, said copolymer containing an average of from 0.05 to 0.5 silicon-bonded OH groups per silicon atom, in the liquid phase with chloroplatinic acid, said copolymer being the sole reactant, whereby the copolymeric molecules interact with themselves with an attendant release of gaseous hydrogen and increase in molecular weight.

6. The method which comprises reacting (1) an organosiloxane polymer consisting essentially of polymeric units of the formula $$(CH_3)_c(C_6H_5)_dSiO_{\frac{4-c-d}{2}}$$

where $c$ is from 0 to 3 inclusive, $d$ is from 0 to 2 inclusive, and the sum of $c+d$ is from 1 to 3 inclusive, the average value of $c+d$ in said polymer being from 1 to 2.5 inclusive and said polymer containing an average of from 0.05 to 0.5 silicon-bonded OH groups per silicon atom, with (2) a compound of the formula $(CH_3)_2HSiOSiH(CH_3)_2$, by contacting (1) and (2) as the sole reactants in the liquid phase in the presence of chloroplatinic acid.

References Cited in the file of this patent

UNITED STATES PATENTS 2,823,218   Speier et al. _____ Feb. 11, 1958